United States Patent [19]

Wlodarczyk et al.

[11] Patent Number: 4,918,305
[45] Date of Patent: Apr. 17, 1990

[54] FIBER OPTIC PRESSURE SENSOR USING PRESSURE SENSITIVE FIBER DIFFERENT FROM INPUT AND OUTPUT FIBERS

[75] Inventors: Marek T. Wlodarczyk, Birmingham; Mark K. Krage, Royal Oak, both of Mich.; Deborah J. Vickers, Malibu, Calif.

[73] Assignee: General Motors Corporation, Detroit, Mich.

[21] Appl. No.: 227,041

[22] Filed: Aug. 1, 1988

[51] Int. Cl.⁴ .......................... H01J 5/16; G01D 5/34
[52] U.S. Cl. .......................... 250/227.14; 250/231.19; 350/96.29; 73/705
[58] Field of Search ............... 250/227, 231 P, 231 R; 350/96.15, 96.29; 73/705, 800

[56] References Cited

U.S. PATENT DOCUMENTS

| | | | |
|---|---|---|---|
| 4,294,513 | 10/1981 | Nelson et al. | 350/96.29 |
| 4,477,725 | 10/1984 | Asawa et al. | 250/231 |
| 4,653,916 | 3/1987 | Henning et al. | 250/227 |
| 4,701,614 | 10/1987 | Jaeger et al. | 250/227 |
| 4,729,240 | 3/1988 | Sugihara et al. | 73/705 |
| 4,730,622 | 3/1988 | Cohen | 250/227 |
| 4,770,492 | 9/1988 | Levin et al. | 350/96.29 |
| 4,792,207 | 12/1988 | Shaw et al. | 350/96.29 |

OTHER PUBLICATIONS

Microbend fiber-optic sensor, from Applied Optics, pp. 2171–2180, vol. 26, No. 11, Jun. 1, 1987.

Fiber Optics Turns to Sensing, from High Technology, pp. 49–56, vol. 2, No. 4, Jul./Aug. 1982.

Metal-clad planar dielectric waveguide for integrated optics, from Journal of the Optical Society of America, pp. 274–279, vol. 64, No. 3, Mar. 1974.

*Primary Examiner*—David C. Nelms
*Assistant Examiner*—Stephone B. Allen
*Attorney, Agent, or Firm*—Robert M. Sigler

[57] ABSTRACT

A microbend fiber optic pressure sensor includes a short length of sensing fiber comprising a fiber of a transparent dielectric material surrounded by a layer of aluminum or similar metal for which the real part of the complex permittivity is negative over a range of electromagnetic radiation wavelengths. The layer of aluminum is hermetically sealed to the transparent material. The sensing fiber receives light in the range of wavelengths and is subjected to microbends on the dielectric/aluminum boundary by pressure responsive mechanical apparatus for a much greater microbend light loss and therefore greater sensitivity than is obtained with similar sensors using an all glass core/cladding boundary. The sensing fiber may be an aluminum coated single mode fiber with a very small core and a large cladding layer in which the cladding modes are used and the core modes ignored or it may comprise a single glass fiber coated with aluminum. The sensing fiber is used only in the sensing region, with light coupled to one end from a light source and from the other end to a light detector through lower loss multimode optic fibers.

5 Claims, 1 Drawing Sheet

FIBER OPTIC PRESSURE SENSOR USING PRESSURE SENSITIVE FIBER DIFFERENT FROM INPUT AND OUTPUT FIBERS

BACKGROUND OF THE INVENTION

This invention relates to a pressure sensor of the type having a sensing fiber subjected to microbends at a material boundary in response to a pressure to be sensed, the sensing fiber comprising a fiber of a transparent medium surrounded by a layer of another medium. It further relates to such a pressure sensor having a light source providing a known light at one end of the transparent fiber and means to sense the light transmitted through the fiber, the latter being reduced by microbend induced losses at the boundary and therefore varying with the sensed pressure.

In the prior art, such pressure sensors are well known using optic communication fibers in which a central core of transparent glass is surrounded by a cladding of glass having an index of refraction less than that of the core. The cladding is generally surrounded by a jacket of light absorbing and physically protective material, an example of which is aluminum. Light is coupled into one end of the core and is reflected from the core/cladding boundary to remain within the core except where the core, cladding and boundary therebetween are affected by microbends applied to the outer surface of the fiber. The microbends affect the core/cladding boundary and the fields within the core and cladding so that a portion of the light in the core escapes through the boundary into the cladding and is eventually absorbed by the jacket surrounding the cladding. The phenomenon is generally explained in simple terms of microbend induced changes in the angle of incidence of the light rays in the core at the boundary leading to a greater portion of the rays passing through the boundary rather than being reflected, although the actual physical processes involved appear to be more complicated, involving the fields of the individual modes within core and cladding.

One parameter of a microbending fiber optic pressure sensor which is of importance is its sensitivity. Prior art sensors have generally used communication grade fibers of the multimode type, in which the core is capable of carrying a plurality of propagation modes, primarily because they are less expensive and easier to work with than single mode fibers. Communication grade fibers, however, are designed for minimal sensitivity to external conditions; and this works against sensitivity to microbending. The sensitivity of sensors using multimode fibers is marginal or insufficient for some applications, such as use as a combustion pressure sensor in an internal combustion engine spark plug. Recent study has indicated that certain single mode fibers, with careful setup and accurate control of dimensions, periodicity of microbending, etc. can exhibit sensitivity somewhat greater than that of the commonly available multimode fibers. However, the increase in sensitivity is still not sufficient for some applications; and the expense of single mode fibers and the careful control of all parameters necessary to obtain the higher sensitivity are handicaps to the use of single mode fibers in this manner.

SUMMARY OF THE INVENTION

We have discovered that a pressure sensor of the type described above with a modified optic fiber arrangement is characterized by substantially greater sensitivity than any of the prior art sensors and demonstrates potential for significantly decreased cost. The sensor uses a sensing fiber which comprises a fiber of a transparent dielectric material surrounded by a layer of metal, such as aluminum, for which the real part of the complex permittivity is negative over the range of electromagnetic radiation wavelengths used, the metal layer being hermetically sealed to the transparent dielectric material; and the light transmission is controlled at the boundary between the transparent dielectric material and aluminum rather than at a boundary between two transparent dielectric materials. The fiber may be an aluminum coated fiber of the type generally known as single mode fiber; but the core is small and the light is coupled mostly to the cladding of the fiber rather than the core so that the cladding modes are used for light transmission through the sensing fiber. Thus, the fiber is used in a single region mode of operation, since the region of transparent dielectric material adjacent the aluminum is the primary light transmission medium. Since the core of the single mode fiber is not used in the sensing apparatus, it may clearly be eliminated so that only the single region of transparent material is contained within the aluminum layer. This has the potential of a greatly decreased cost for the fiber, since it may be made from a much less expensive glass preform.

In either case, as already stated, the relevant boundary which determines microbending losses is a boundary between a dielectric material, such as glass, and aluminum. Aluminum is a partially absorbing, partially reflecting material. The phenomenon of microbend induced light loss at such a boundary is quite different than that at a typical glass/glass boundary; and it appears to exhibit a greater light loss with microbending in such sensors than the typical prior art dielectric/dielectric boundary and thus provide a sensor of much greater sensitivity.

Because microbending losses are so much greater in the sensing fiber, the sensing fiber is confined to a short microbend sensing region, with separate, lower loss means for conducting light from a light source to one end of the sensing fiber and from the other end of the sensing fiber to a light detector. Such means may comprise a multimode fiber with a core used for light conduction and therefore aligned with the transparent portion of the sensing fiber. For the sensing fiber, the single mode fiber is readily available as high grade communications fiber but is quite expensive, due to the difficulties of forming the small core therein. Since this core is not useful to this invention and adds to the cost, the single region fiber, which has no such core, is seen as the ultimate best mode of the invention when such fiber becomes readily available.

In addition to the preceding, the aluminum layer, hermetically sealing the fiber for protection from the environment, stands up to higher temperatures than many other jacketing materials used in optic fibers and thus provides the opportunity for high temperature applications such as a combustion chamber pressure sensor incorporated in an engine spark plug. Further details and advantages of the invention will be apparent from the accompanying drawings and following description of a preferred embodiment.

DESCRIPTION OF THE PREFERRED EMBODIMENT

Figure 1:
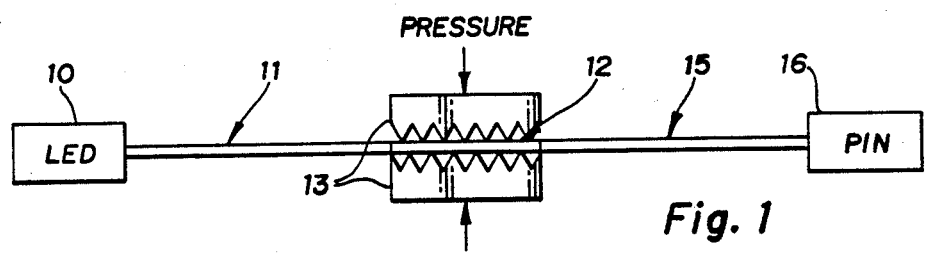
FIG. 1 shows a preferred embodiment of this invention.

FIG. 1 shows the basic arrangement of the sensor of this invention, in which a light source 10 couples light into one end of an optic fiber 11, the other end of which is coupled to one end of a sensing fiber 12 contained within pressure activated mechanical microbend inducing apparatus 13. The other end of sensing fiber 12 is coupled to an optic fiber 15, which leads to a light detector 16. Increased pressure acts on apparatus 13 to create microbends in sensing fiber 12 and thus increase the light loss therefrom. Such a basic arrangement is known in the prior art, except for the nature of the sensing fiber 12 and the coupling of light thereto by the optic fibers 11 and 15.

In the apparatus of FIG. 1, optic fibers 11 and 15 may be any such fibers which can efficiently conduct light over the required distances between sensing fiber 12 and the light source 10 and light detector 16 with minimal sensitivity to external conditions. A preferred optic fiber is conventional communication grade multimode glass fiber which is comparatively microbend and macrobend insensitive, with dimensions determined by the dimensions of the sensing fiber and type of coupling used and with the core modes used for light transmission.

Light source 10 might be a gas laser, which has the advantage of higher power, which minimizes the problems of coupling power losses at the junctions of the various parts of the apparatus. However, a gas laser is expensive and produces coherent light, which causes speckle noise in a multimode light transmitting fiber. A laser diode also has high power and does not exhibit speckle noise but is still somewhat expensive. An edge emitting LED has no speckle noise problem and costs about the same as a laser diode but has a lower power output. A surface emitting LED has no speckle noise problem and is the lowest cost light source but has a low power output, with even less usable power due to its broader output cone of emitted radiation, which is less efficiently coupled to the end of optic fiber 11. All things considered, a surface emitting LED is the preferred light source where cost is a factor, as long as the power losses within the system can be minimized. If power losses become a significant problem, the laser diode is a more expensive but useful alternative. Clearly, the relative advantages and disadvantages of these devices or others may change in the future with improvements in power output, changes in cost and other factors. The choice of a light source is not part of the invention, which covers any such useful light source.

Light detector 16 may be a PIN photodiode or any similar device for producing an electrical output signal in response to an input light intensity. If a surface emitting LED is used as the light source and standard multimode fiber for the optic fibers 11 and 16, the light sourcing, detecting and conduction to and from the sensing fiber is accomplished with inexpensive, readily available components.

Figure 2:
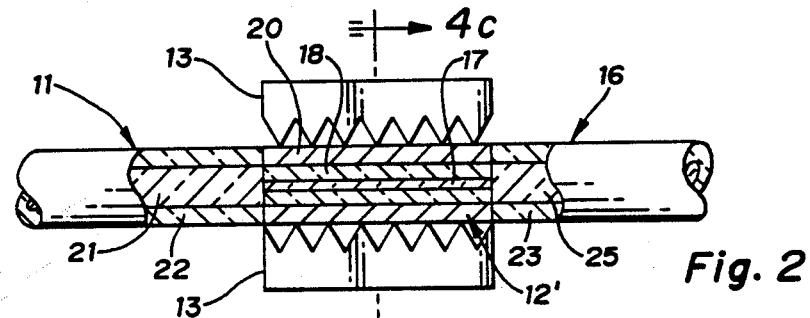
FIG. 2 shows an enlarged view of a portion of the embodiment of FIG. 1 using a single mode fiber in the sensing region.
Figure 4A:
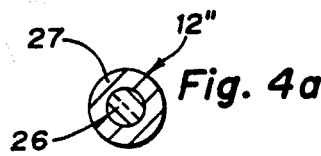
FIGS. 4a, 4b and 4c show cross sections of multimode, single region and single mode fibers, respectively.

One embodiment of sensing fiber 12 and its coupling arrangement to optic fibers 11 and 15 is shown in FIG. 2. In this embodiment, sensing fiber 12' is a single mode fiber having a small diameter (for example, 5-8 microns) glass core 17 surrounded by a much larger diameter (for example, 125 microns) cladding 18 made of glass having an index of refraction smaller than that of core 17. Surrounding and hermetically sealing cladding 18 is a layer 20 of aluminum or a similar metal for which the real part of the complex permittivity is negative in the range of electromagnetic radiation wavelengths being used. Similar electrically conducting metals such as silver, gold or possibly copper might also be used, depending on the relationship between the real and imaginary parts of their complex permittivities, which determines their lossiness. These layers are also shown in cross section in FIG. 4c.

Figure 4B:
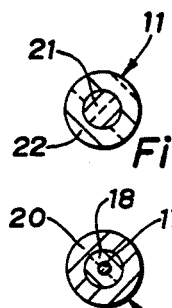
Figure 4C:
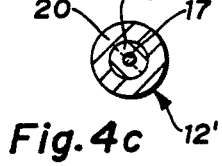

Referring to FIGS. 2 and 4b, optic fiber 11 is a multimode fiber with a large diameter core 21 surrounded by cladding 22. Core 21 has a diameter essentially equal to and aligned with that of cladding 18 of sensing fiber 12'. Similarly, optic fiber 16 is multimode glass fiber with a core 23 and cladding 25 similar in diameter to core 21 and cladding 22 of fiber 11 and similarly aligned and coupled to the other end of sensing fiber 12'. The light from light source 10 is coupled into core 21 of fiber 11, which couples it, with minimal losses, mostly to cladding 18 of sensing fiber 12'. Since the glass of cladding 18 is a transparent dielectric material, the boundary between it and the aluminum layer 20 is a dielectric/aluminum boundary, which is subject to the microbends induced by apparatus 13. Sensing fiber 12 is of comparatively short length (5-10 cm), which is long enough to provide significant microbend losses but short enough to minimize losses not due to microbending. A small fraction of the light will be coupled to core 17 of sensing fiber 12'; but its effect is essentially negligible if non-microbend cladding losses are minimized by the short distance of the sensing fiber. Thus, sensing fiber 12' is a single mode fiber used in a single region mode of operation.

Figure 3:
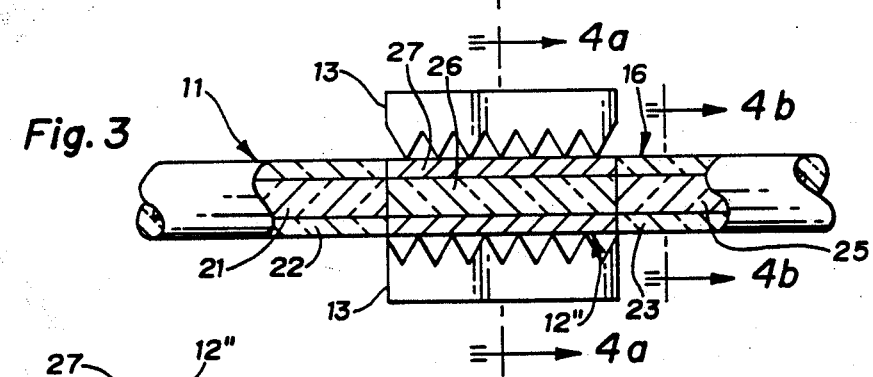
FIG. 3 shows an enlarged view of a portion of the embodiment of FIG. 1 using a single region fiber in the sensing region.

FIG. 3 shows a single region sensing fiber 12" coupled to optic fibers 11 and 16. Single region fiber 12", as also seen in FIG. 4a, comprises a central glass fiber 26 surrounded and hermetically sealed by an aluminum layer 27. Glass fiber 26 has a diameter equal to and is aligned with core 21 of optic fiber 11 and core 23 of optic fiber 16. The rest of the embodiment is similar to that of FIG. 2. The main advantage of the single region fiber is its cost, since the sensing fiber may be made from a comparatively inexpensive glass preform such as Fluorosil (T), which costs $30 compared to $2,000 for a similar preform of single or multimode communications grade glass.

The phenomenon of microbend induced light loss at the boundary between the transparent material and aluminum or similar metal appears to be related to coupling of the light in the transparent material into the surface plasmon or surface propagating wave at the boundary of a dielectric such as glass and a metal such as aluminum. A surface plasmon can be propagated along such a boundary for electromagnetic radiation wavelengths for which the real part of the complex permittivity of the metal is negative. The wavelengths involved for electrically conducting metals such as aluminum are in the visible and infrared region.

This surface plasmon has a field decaying exponentially in both directions from the boundary; but the majority of the field is in the metal, which is a high attenuation region for the light radiation. In order to excite the plasmon with the light in the glass approaching the boundary at a particular angle of incidence, a phase matching condition must exist wherein the wave number of the radiation in the dielectric equals the wave number of the radiation in the plasmon. The maximum wave number of the radiation in the dielectric is found for radiation parallel to the boundary and equals the product of the normalized frequency of the radiation and the square root of the permittivity of the dielectric. However, in the absence of deformation of the boundary, the wave number of the plasmon is greater than this maximum wave number of the dielectric and no excitation or coupling occurs.

If there is a periodic deformation of the boundary, however, an additional factor, depending on the periodicity of deformation, is added to the wave number of the dielectric, which depends on the angle of incidence. Thus, the phase matching condition is created for a particular angle of incidence at a given periodicity. In the presence of a periodic deformation, therefore, the light in the glass approaching the boundary with the particular angle of incidence couples with the plasmon. Since most of the plasmon field is in the metal, which greatly attenuates the light, there is a strong absorption and attenuation of light at the particular angle of incidence. An arbitrary deformation, which can be considered the superposition of a series of periodic deformations of different periodicities, causes absorption for a series of angles of incidence in the dielectric; and most of the light in the glass, therefore, couples to the plasmon and is absorbed in the metal. It appears that the coupling of the light in the dielectric to the surface plasmon at the dielectric/metal boundary in the presence of deformation of the boundary and the strong attenuation of such coupled light by the majority of the plasmon field in the metal are responsible for the high sensitivity of the sensor of this invention.

The junction of optic fiber 11 and sensing fiber 12 may be accomplished by several means. Epoxied couplers are inexpensive but not very repeatable. Fusion couplers are mechanically stable (and thus vibration resistant—important for internal combustion engine applications) and low loss but requires removal of the aluminum layer in the vicinity of the splice with breakage of the hermetic seal and exposure of the fiber to environmental effects such as water. SMA connectors are rugged and reasonably stable. Those using a crimp attachment may be unsuitable for the aluminum jacketed fiber, since the aluminum is too soft to hold a good crimp. The epoxied version is preferred.

Figure 5:
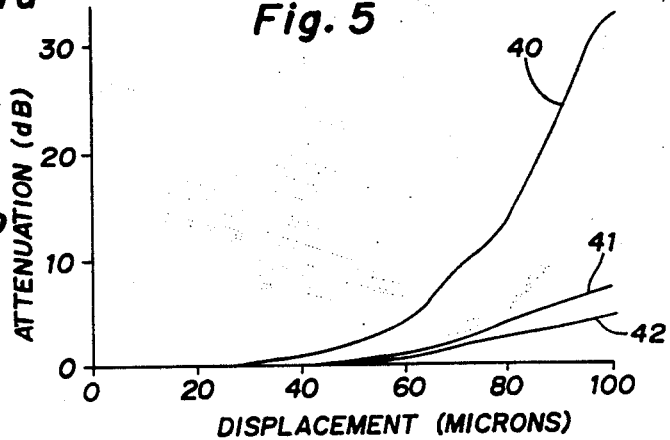
FIG. 5 shows graphs of pressure induced microbending displacement versus light attenuation for several types of fibers used in microbending pressure sensors to illustrate the comparative sensitivity.

FIG. 5 shows graphs of attenuation as a function of microbend displacement for a number of optic fibers to demonstrate the improvement in sensitivity of the sensor of this invention. Curve 40 shows the attenuation of an aluminum coated single mode optic fiber with no mode stripping, so that most of the light entering the microbend region is transmitted in the cladding and is thus controlled by a glass/aluminum boundary in the microbend region. This is an example of the single mode embodiment of this invention. Curve 41 shows the sensitivity of the same fiber with mode stripping prior to the beginning of the microbend region, so that only the core mode is used and the light attenuation is controlled by the glass/glass boundary between core and cladding in the normal manner of the prior art. The common specifics of the apparatus were outer fiber diameters of 8 microns for the core, 81 microns for the cladding and 110 microns for the aluminum, a 660 nm wavelength LED source, a 1.5 mm periodicity microbend deformer over a 5 cm length of fiber and a fiber numerical aperture of 0.14. The mode stripping for curve 41 was accomplished with 1 cm radius loop mode strippers before and after the microbend region, so that only the core mode affected the curve shown. Curve 42 shows a similar curve for the multimode fiber having a similar numerical aperture (0.133) typical of the most sensitive multimode fibers known to the inventors. The outer diameters of this fiber are 73.2 microns for the core, 99.1 microns for the cladding and 129.5 microns for the aluminum. The curve was generated in the same manner with mode stripping before and after the microbend region. This multimode fiber is typical of that used in most prior art sensors of the microbend type, since the fiber is less expensive than the single mode fiber of curve 41.

It is evident from the graphs that the sensitivity of the fiber to microbending, which is shown by the slope of the curves in the useful region from approximately 60–100 microns displacement, is much greater for curve 40 than for either of curves 41 or 42. In practice, the useful region of maximum slope would be obtained by a controlled preload of the deformation apparatus.

The embodiments of the invention in which an exclusive property or privilege is claimed are defined as follows:

1. A fiber optic pressure sensor comprising, in combination:
    a sensing fiber comprising a short length of single region transparent fiber of a dielectric material surrounded circumferentially by a layer of a metal for which the real part of the complex permittivity in a predetermined range of wavelengths is negative, the layer of metal hermetically sealing the fiber and defining a dielectric/metal boundary;
    mechanical means for producing microbends in the sensing fiber at the dielectric/aluminum boundary in response to a pressure to be sensed;
    a source of light at the predetermined range of wavelengths;
    a first optic fiber coupling light from the source of light to one end of the transparent sensing fiber;
    a light detector; and
    a second optic fiber coupling light from the other end of the transparent sensing fiber to the light detector, whereby microbends at the dielectric/aluminum boundary in response to the pressure to be sensed cause increased light loss from the transparent medium to the aluminum within the sensing fiber and thus decrease the light detected by the light detector.

2. The fiber optic pressure sensor of claim 1 in which the metal is aluminum.

3. The fiber optic pressure sensor of claim 1 in which at least one of the first and second optic fibers is a multimode glass optic fiber comprising a glass core having a first index of refraction and a diameter substantially equal to that of the single region transparent fiber and being aligned with and coupled to an end thereof and a glass cladding having a second index of refraction smaller than the first index of refraction so that light is coupled between the core of the multimode glass optic fiber and the single region transparent fiber.

4. The fiber optic pressure sensor of claim 1 in which the light source is an LED.

5. The fiber optic pressure sensor of claim 1 in which the short length of single region transparent fiber comprises a short length of single mode optic fiber comprising a core and cladding of transparent dielectric materials in which the index of refraction in the cladding is less than that in the core, the diameter of the core being a small fraction of the outer diameter of the cladding, the majority of the light from the first optic fiber being coupled to the cladding of the sensing fiber.

* * * * *